Dec. 23, 1924.
J. MEACHEN
FISHING ROD SUPPORT
Filed July 19, 1924
1,520,543
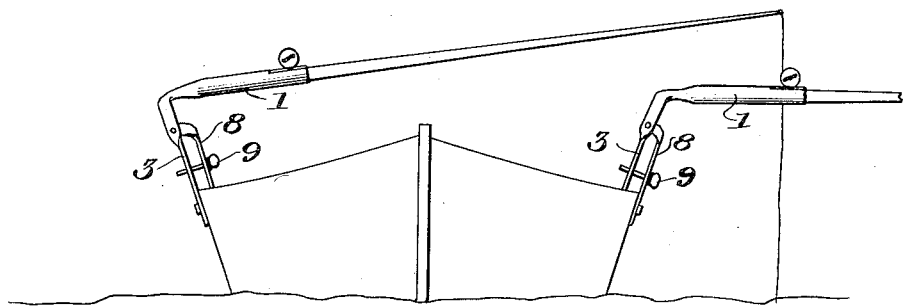
Fig. 1.
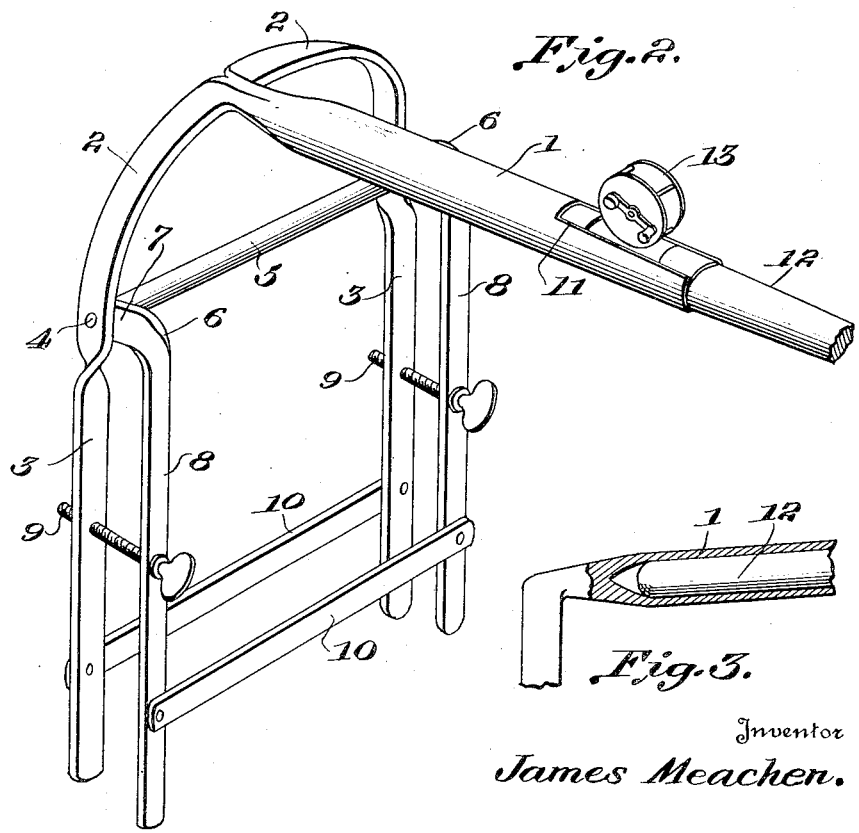
Fig. 2.
Fig. 3.
Inventor
James Meachen.
By Mason Fenwick & Lawrence
Attorneys Patented Dec. 23, 1924.

1,520,543

UNITED STATES PATENT OFFICE.

JAMES MEACHEN, OF DICKSON, PENNSYLVANIA.

FISHING-ROD SUPPORT.

Application filed July 19, 1924. Serial No. 726,367.

*To all whom it may concern:*

Be it known that I, JAMES MEACHEN, citizen of the United States, residing at Dickson, in the county of Lackawanna and State of Pennsylvania, have invented certain new and useful Improvements in Fishing-Rod Supports; and I do hereby declare the following to be a full, clear, and exact description of the invention, such as will enable others skilled in the art to which it appertains to make and use the same.

This invention relates to supporting devices and more particularly to a device for supporting fishing rods.

The object of the invention is to provide a fishing rod support of an improved and simplified structure lending itself to economical manufacture, ready adjustment and simplicity and efficiency in operation.

The invention consists in the novel construction, arrangement, and combinations of parts as hereinafter more particularly described and claimed.

One sheet of drawings accompanies this specification as part hereof in which like reference characters indicate similar parts throughout.

Figure 1 is a front elevation of a boat showing the improved device applied in two convenient positions, Figure 2 is a perspective view of the improved device, Figure 3 is a detail view, partly in cross section.

In accordance with the present invention a tubular member 1 is connected at one end as by welding with two flat metal strips 2—2 which are bent perpendicular to the rod and arcuately in a common plane to constitute a substantially U-shaped member, the legs 3—3 of which are bent so that their flat faces lie in a common plane parallel with the frame of the entire U-shaped member. The legs 3—3 are divided approximately mid length with threaded holes adapted to receive thumb screws 9—9.

The members 2—2 are provided with holes above and adjacent the bend limiting the legs 3—3 to accommodate a pivot rod 4, upon which are pivotally mounted angular members 6—6, which are spaced by a tubular spacing member 5, and which are bent substantially at right angles to form short legs 7—7, the flat faces of which are parallel with the adjacent faces of the members 2—2. The members 6—6 are further bent at their apex so that the long legs 8—8 extend normally parallel and with their broad faces in a plane parallel to the legs 3—3. The legs 8—8 are further provided with holes, through which the thumb screws 9—9 pass, thus permitting the adjustment of legs 8—8 with reference to the legs 3—3 to constitute gripping jaws.

The lower ends of legs 3—3 and 8—8 are preferably connected by spacing members 10—10 secured upon their outer faces.

In the upper wall of tubular member 1 and adjacent its free end is provided a notch 11 adapted to receive reel 13 when the handle of the fishing rod 12 is inserted in the tubular member 1 as is indicated in Figure 2.

Having thus fully described my invention I claim:

1. In a supporting device, a tubular member connected at one end with a U-shaped member in a plane substantially perpendicular to the tubular member, spaced gripping members pivotally supported between the legs of the U-shaped member and means for adjusting the gripping members with respect to the legs of the U-shaped member.

2. A supporting device of the character indicated, comprising a tubular member having a notch in the upper wall of its free end, a substantially U-shaped member connected with the opposite end of the tubular member and lying in a plane perpendicular thereto, the legs of said U-shaped member being flattened and lying in a common plane perpendicular to said tubular member, and flat gripping members pivotally supported between and adjacent the legs of the U-shaped member, said flat gripping members having their broad faces in a common plane, substantially parallel with the plane of the legs of the U-shaped member, with means for adjusting the gripping members with respect to the legs of the U-shaped member.

In testimony whereof I affix my signature.

JAMES MEACHEN.